July 5, 1960

M. E. CAMPBELL 2,943,824

TRACKING DISPLAY FOR AIRCRAFT

Filed Oct. 18, 1955

INVENTOR.
MARK E. CAMPBELL
BY *William R. Lane*
ATTORNEY

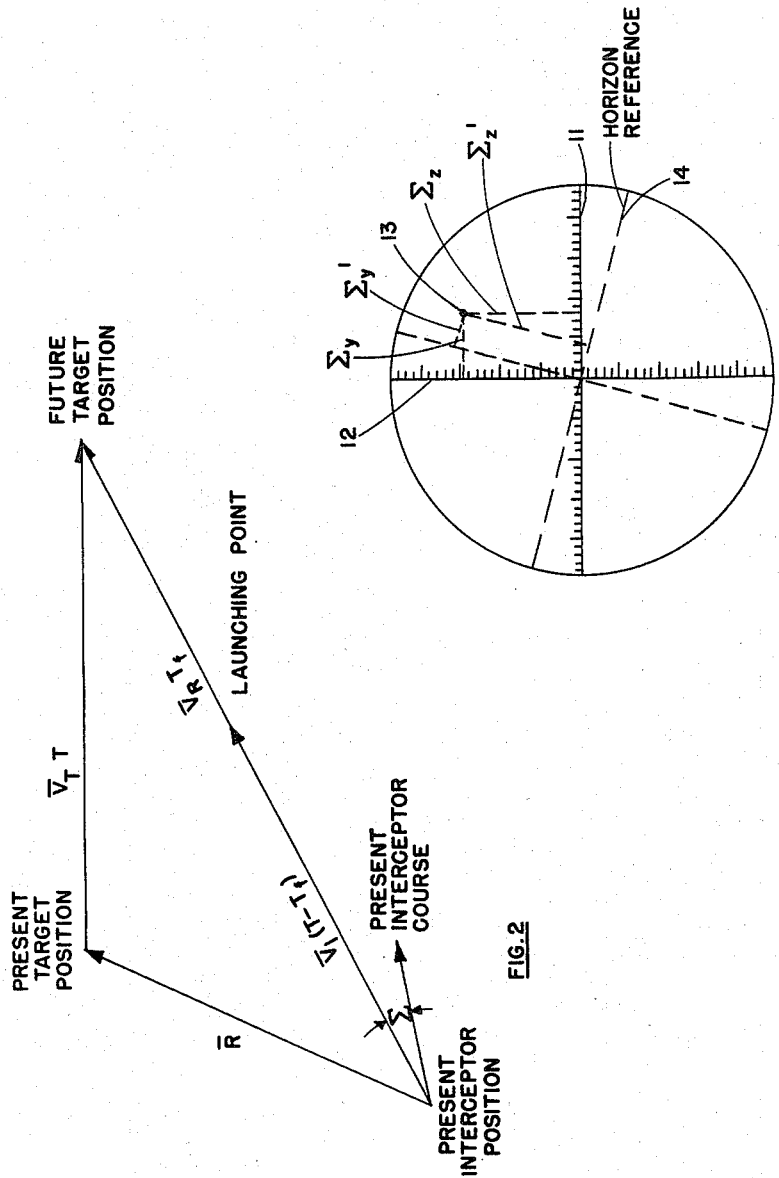

July 5, 1960  M. E. CAMPBELL  2,943,824
TRACKING DISPLAY FOR AIRCRAFT
Filed Oct. 18, 1955  3 Sheets-Sheet 3

INVENTOR.
MARK E. CAMPBELL
BY
William R. Lane
ATTORNEY

United States Patent Office 2,943,824
Patented July 5, 1960

2,943,824

TRACKING DISPLAY FOR AIRCRAFT

Mark E. Campbell, Whittier, Calif., assignor to North American Aviation, Inc.

Filed Oct. 18, 1955, Ser. No. 541,151

10 Claims. (Cl. 244—77)

This invention relates to a correction display device and particularly to an improved tracking display for aircraft.

Present interceptor aircraft are provided with a fire and flight control computer, an autopilot and associated circuitry which is normally capable of accurately guiding the interceptor to a preselected position relative to an enemy target. Upon arrival at this preselected position, the interceptor launches its rockets or fires its guns for the purpose of destroying the enemy aircraft. The interceptor aircraft is further provided with a control device, called a formation stick, which can be utilized to guide the interceptor aircraft in manual operation. The formation stick can be displaced about two axes, known as the pitch and yaw axes, and provides the pilot with a convenient means for maneuvering the interceptor through the medium of hte autopilot. When the formation stick is displaced in pitch, the autopilot causes the interceptor to pitch at a rate determined by the magnitude of the stick displacement. When the formation stick is displaced in yaw, the autopilot causes the interceptor to roll into a coordinated turn in which the yaw rate is determined by the amount of stick displacement.

The fire control computer, utilized in the interceptor, converts inputs from a conventional altimeter, radar, machmeter, vertical gyro and rate gyros into electrical signals, which are predetermined functions of the instantaneous pitch and yaw angles of error, $\Sigma_z$ and $\Sigma_y$. The total aiming error angle, $\Sigma$, is defined as the angle between the instantaneous heading of the interceptor aircraft and the computed heading of the interceptor aircraft necessary to position the interceptor at the above-mentioned preselected position, or launching point, relative to the target. The total aiming error angle is the vector sum of the pitch aiming error angle and the yaw aiming error angle. When the interceptor is operating in the automatic mode, the outputs of the fire control computer are coupled directly to the autopilot and produce in the autopilot appropriate pitch, yaw and roll rates $\dot{\theta}$, $\dot{\psi}$, and $\dot{\phi}$, respectively. In this automatic mode the pilot merely supervises the flight of the interceptor preparatory to taking over control after launching the rockets.

It has been found desirable to provide for a manual mode of operation of the autopilot, thereby by-passing the rate outputs of the fire control computer during the initial approach to the enemy target. The pilot switches to the more accurate automatic mode when the firing time is a few seconds away if conditions are favorable. In the manual mode of operation of the autopilot, the pilot is guided by a display on an oscilloscope which indicates the instantaneous total aiming error angle of the interceptor, as well as its pitch and yaw components.

The manual or pilot-link mode has several advantages as an independent or alternate fire control mode. When utilized during radar lock-on, the sudden transients due to the direct coupling of the fire control computer to the autopilot following radar lock-on are avoided. Further, the pilot-link mode places the pilot in the system in such a way that he is free to exercise judgment and prediction. He is in a position to lead the error signals on the basis of experience and training to anticipate the change in interceptor response required by target maneuvers in a way which augments the automatic prediction of the fire control computer. Also, in steady turns the pilot can bring to zero the aiming error angle signals as an automatic integrator would do but without the disadvantage of holdover of an integrated error signal during the transient following the steady turn. Further, when the radar glint noise becomes severe, the pilot using the pilot-link mode acts as an adjustable filter, exercising judgment in his mental averaging of the displayed error signals.

As has been previously noted, the pilot is provided with a display on the oscilloscope which, by means of a dot displacement relative to aircraft coordinates, gives him an accurate indication of the aiming error angles. When the pilot decides that corrective action is required to bring the aiming error angle to zero, he displaces the formation stick about its two axes of motion. He must judge how far to move the stick about each axis on the basis of guess, training or previous experience. His action on the stick is completed in a very short time, considerably before he notices any appreciable movement of the error dot on the oscilloscope in response to his action. In some cases, especially when the target is maneuvering violently, the response of the error dot to the displacement of the formation stick is completely obscured. Ordinarily, if the pilot moves the stick in a manner to generate the correct pitch, yaw and roll rates, the error dot begins to move back towards center. Now the pilot must judge when to return the formation stick to zero so that the dot does not overshoot. The action of the stick relative to the dot displacement is difficult to judge.

It is therefore an object of this invention to provide an improved tracking display for aircraft useful for accurately maneuvering an aircraft relative to a target.

It is another object of this invention to provide an improved tracking display utilizing an oscilloscope which, in addition to displaying an indication of the aiming error angle, also displays an immediate indication of the action by the pilot to compensate for said aiming error angle, so that it is unnecessary for the pilot to wait until the aircraft stabilizes in motion or attitude to observe the attitude of his corrective action. It is a further object of this invention to provide an improved correction display device for indicating the magnitude of a correctional factor utilized to compensate for errors in a condition indicating system.

It is another object of this invention to provide an improved tracking display for aircraft useful for accurately maneuvering an aircraft in relation to a target.

Other objects of this invention will become apparent from the following description taken in connection with the accompanying drawings, in which Fig. 1 is a simplified block diagram of the computer-formation stick-autopilot combination utilizing a preferred embodiment of this invention;

Fig. 2 is a vector diagram of a typical fire and flight control problem solved by the computer of Fig. 1;

Figure 4:
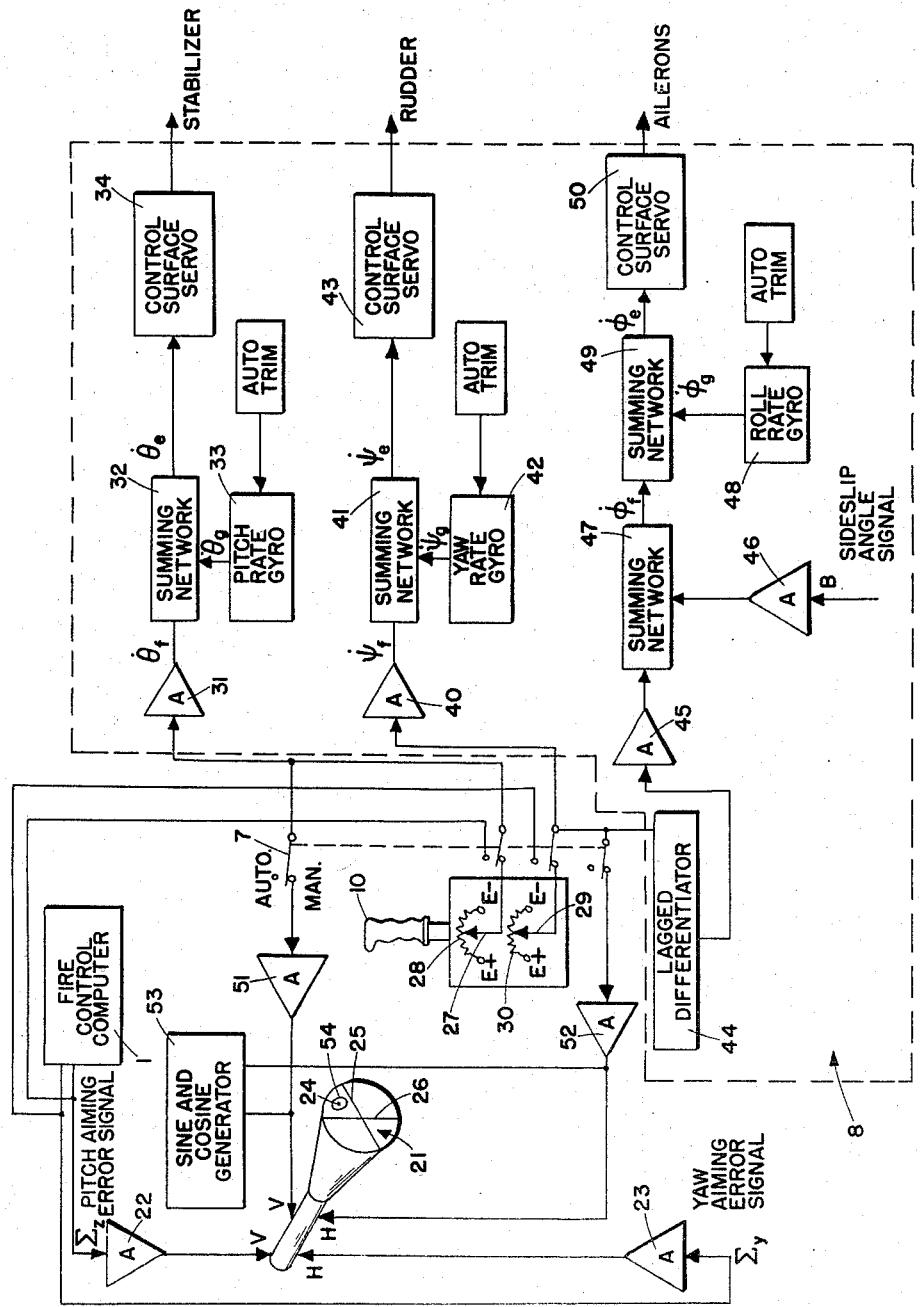
Fig. 4 is a detailed block diagram of the tracking display circuit utilized in the embodiment of Fig. 1.

And Fig. 5 is a view of a typical oscilloscope display on the plate of the oscilloscope of Fig. 4.

Figure 1:
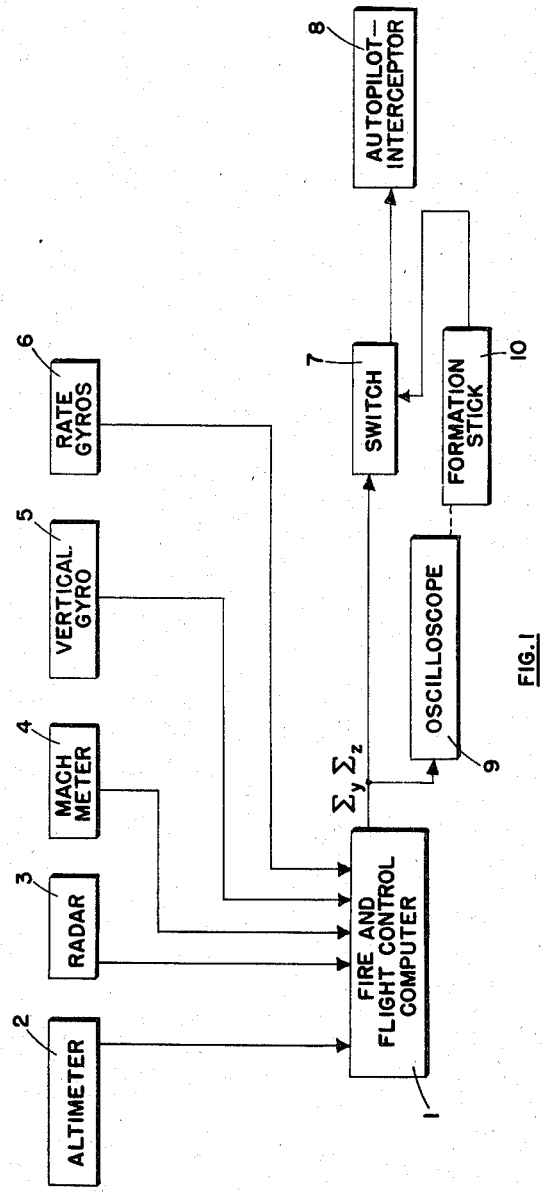

Referring now to Fig. 1, a simplified block diagram of the computer-formation stick-autopilot combination utilized in the preferred embodiment of this invention is shown. Fire and flight control computer 1 utilizes inputs from conventional altimeter 2, radar 3, machmeter 4, vertical gyro 5 and rate gyros 6, to generate electric signals which are predetermined functions of the instantaneous pitch aiming error angle $\Sigma_z$ and the yaw aiming error angle $\Sigma_y$. These electric signals are utilized in the automatic mode to generate in the autopilot signals which are predetermined functions of a desired pitch rate $\dot{\theta}_c$, yaw rate $\dot{\psi}_c$, and roll rate $\dot{\phi}_c$. The magnitudes of these rate signals relative to the error angle signals are preselected to reduce the computed aiming error angles to zero as rapidly as possible, taking into consideration the aerodynamic characteristics of the interceptor aircraft. As has been previously pointed out, the total aiming error angle is defined as the instantaneous angular error in the heading of the interceptor compared to the computed heading to the armament launching point as shown in Fig. 2. The total aiming error angle has two component parts, the pitch aiming error angle, $\Sigma_z$, and the yaw aiming error angle, $\Sigma_y$.

Computers have been developed in the past which generate the aforementioned aiming error angles utilizing such computed information as speed, heading and altitude of the interceptor; the range, bearing and the rates of change of range and bearing of the target; and the armament velocity. Utilizing principles well-known to those skilled in the art, these computers solve the vector diagram of Fig. 2 in a manner to produce an indication of the total aiming error angle, $\Sigma$. The computer also resolves this total aiming error angle into its components about the pitch and yaw axes of the interceptor, including the effect of roll. Autopilot-interceptor 8 responds to these error component signals from computer 1 to generate commanded rate signals which actuate the control surface servos of autopilot 8 when switch 7 is in the automatic mode position. These aiming error angle signals are disconnected from autopilot 8 when the manual mode is used.

As has been previously pointed out, factors such as violent maneuvering of the enemy aircraft and radar glint noises frequently make it desirable to switch from the fully automatic actuation of the autopilot 8 to a manual operation. When switch 7 is positioned for manual operation of autopilot 8, the signals from fire and flight control computer 1, which are proportional to the pitch and yaw aiming error angles, continue to be conveyed to oscilloscope 9, thereby providing a visual indication of the magnitude of these error angles. The pilot can then generate desired correction signals by moving formation stick 10 to actuate autopilot 8 in a manner to reduce the aiming error angle to zero.

Referring now to Fig. 5, a view of a typical oscilloscope display is shown. Fixed horizontal and vertical reference lines 11 and 12 on the surface of the oscilloscope provide visual indications of the yaw and pitch axes, respectively, of a graphic indication of the total aiming error angle. By a circuit to be described later, dot 13 is displaced from the intersection of lines 11 and 12 by an amount proportional to the aiming error angle $\Sigma$. The displacement of dot 13 along horizontal line 11 is made proportional to the yaw aiming error angle $\Sigma_y$, while the displacement along vertical line 12 is made proportional to the pitch aiming error angle $\Sigma_z$. Thus, when the pitch and yaw aiming error angle signals are coupled from the computer to the vertical and horizontal deflection plates, respectively, of one gun of oscilloscope 9 of Fig. 1, dot 13 is positioned in such a way that both error components are readily available to the pilot. It is to be noted that there is a fixed relationship between the actual value of the aiming error in degrees and the corresponding displacement of the error dot on the oscilloscope face. This relationship is called the error dot gain, in degrees of aiming error per inch of dot displacement. Preferably, the error dot gain is the same with reference to each of the reference axes of the oscilloscope presentation. An error dot gain of from two to five degrees per inch is a typical value. The signs of the error signals are so arranged that the dot represents the relative target position. In the manual mode the pilot utilizes the formation stick to maneuver the interceptor toward the dot in order to bring the dot to the center of the oscilloscope.

It is to be noted that when the interceptor rolls, horizon reference line 14 on the oscilloscope changes position accordingly, and error dot 13 also moves, maintaining a relatively steady relationship to the horizon reference, assuming a constant total aiming error. Therefore, the aiming error angle indication shown in Fig. 5 can also be resolved into "inertial" horizontal and vertical aiming error angles $\Sigma_y'$ and $\Sigma_z'$, referenced to the true horizontal and vertical axes as determined by conventional gyroscopic means. An alternative embodiment of the manual operation of the interceptor can thus use a formation stick which produces outputs proportional to the gyroscopically maintained, or inertial horizontal and vertical movements rather than the interceptor yaw and pitch movements utilized in the example.

Figure 3:
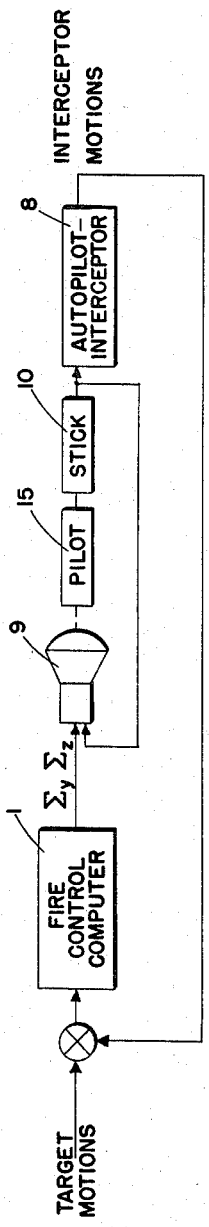
Fig. 3 is a block diagram of the servo loops utilized in the preferred embodiment of this invention shown in Fig. 1.

Referring now to Fig. 3, a block diagram of the servo mechanism utilized in manual operation of the interceptor is shown. When pilot 15 moves stick 10, autopilot 8 actuates the stabilizer, rudder and aileron (not shown) of the interceptor in a direction determined by the displacement of stick 10. The actuation of the stabilizer, rudder and aileron result in pitch, yaw and roll, respectively, of the interceptor. These interceptor motions affect the pitch, roll and yaw aiming error signals generated by computer 1. If the interceptor control surfaces have been moved in the correct direction, the aiming error signals are reduced. This reduction is indicated on oscilloscope 9 by a movement of dot 13 toward reference lines 11 and 12 of Fig. 5. A second factor affecting the aiming error angles is a deviation of the target airplane from its predicted course and speed. The response of computer 1 to the target motions is practically instantaneous. It is to be noted, however, that there is an appreciable time lag between the movement of formation stick 10 by pilot 15 and the response of the interceptor. This time lag makes it very difficult for the pilot to judge the magnitude and length of time he should displace formation stick 10. By providing a secondary servo loop between the output of stick 10 and the input to scope 9, the display system contemplated by this invention provides a rapid indication, visually presented to the pilot, of the effect of any displacement of the formation stick.

Referring now to Fig. 4, formation stick 10 is a two-axis control and produces two signals, one dependent on its fore-and-aft (pitch) displacement and one dependent on its lateral (yaw) displacement. The stick is returned to the center or null position by springs (not shown), which are preloaded enough to facilitate restoration when pressure on the stick is removed. In the manual mode of operation the signal responsive to displacement of stick 10 about the pitch axis of the stick is coupled into the pitch rate channel in place of the pitch aiming error signal from computer 1 and the signal responsive to displacement of formation stick 10 about the yaw axis of the stick is coupled into the yaw and roll rate channels in place of the yaw aiming error signal from computer 1. Except for differences in relative signal levels, the operation of autopilot 8 in the manual mode is the same as in the fully automatic mode.

In Fig. 4, a detailed block diagram of the electronic circuits of a preferred embodiment of this invention is shown. As previously pointed out, fire control computer 1 generates electric signals proportional to pitch aiming error angle $\Sigma_z$ and yaw aiming error angle $\Sigma_y$. When switch 7 is in the manual position as shown, the aiming error signals from the fire control computer are disconnected from autopilot 8. Autopilot 8 now receives signals only from the formation stick 10, and interprets them as commanded rate signals.

The aiming error signals from fire control computer 1 are continuously conveyed to the deflection plates of one gun of oscilloscope 21. Thus, pitch aiming error signal $\Sigma_z$ is coupled through amplifier 22 to the vertical deflection plates of one gun of oscilloscope 21, and yaw aiming error signal $\Sigma_y$ is conveyed through amplifier 23 to the horizontal deflection plates of the same gun of oscilloscope 21. In a manner similar to that previously described with respect to Fig. 5, dot 24 on face of oscilloscope 21 is displaced from horizontal reference line 25 by an amount proportional to the pitch aiming error. Similarly, dot 24 is displaced from vertical reference line 26 by an amount which is proportional to the yaw aiming error.

The pilot (not shown), seeing that the interceptor is not headed on the correct course to reach the launching point, displaces formation stick 10 about its two axes of freedom. This displacement generates electric signals which are predetermined functions of the displacement of the stick about each axis. For example, movement of formation stick 10 in a fore-and-aft direction causes a corresponding rotation of wiper 27 on potentiometer 28. Wiper 27 therefore picks off a D.-C. voltage which is a predetermined function of the magnitude of the angular rotation of formation stick 10 about the pitch axis and which has a polarity which is determined by the direction of movement of formation stick 10 from a neutral or null position. Similarly, movement of formation stick 10 to the left or right results in a D.-C. voltage on wiper 29 of potentiometer 30, which has a polarity dependent on the direction of motion and a magnitude which is a predetermined function of the magnitude of the angular displacement of stick 10 about the yaw axis.

The signal from formation stick 10, which is proportional to the displacement of the stick about the pitch axis, is coupled through amplifier 31 to summing network 32 of autopilot 8. The output of amplifier 31 is an electric signal which is proportional to a formation or commanded pitch rate, $\dot{\theta}_f$, corresponding to magnitude of displacement of formation stick 10 about the pitch axis. This commanded pitch rate, $\dot{\theta}_f$, is compared in summing network 32 to the instantaneous actual pitch rate, $\dot{\theta}_g$, of the interceptor as indicated by a signal from pitch rate gyro 33. For the same formation, or commanded, and actual pitch rates, $\dot{\theta}_f$ and $\dot{\theta}_g$, respectively, the signals from amplifier 31 and pitch rate gyroscope 33 are designed to be equal and opposite. As long as the two input signals to summing network 32 are equal and opposite, output signal $\dot{\theta}_e$ is zero. A change in one of the input signals results in a signal output, $\dot{\theta}_e$, of summing network 32 proportional to the difference in input signals. This error pitch rate, $\dot{\theta}_e$, is coupled to control surface servo 34. Control surface servo 34, when actuated by a signal from summing network 32, causes a movement of the stabilizer (not shown) of the interceptor. This results in a change in the pitch rate of the interceptor and a corresponding change in the output, $\dot{\theta}_g$, of pitch rate gyro 33. When the instantaneous pitch rate, $\dot{\theta}_g$, is equal to the formation or commanded pitch rate, $\dot{\theta}_f$, the output of summing network 32 is reduced to zero and the stabilizers are maintained in their adjusted position until formation stick 10 is again moved about its pitch axis.

The signal from formation stick 10, which is proportional to the displacement of the formation stick about the yaw axis, is coupled through amplifier 40 to summing network 41. The output of amplifier 40 is an electric signal which is proportional to the formation or commanded yaw rate, $\dot{\psi}_f$, corresponding to the magnitude of the command displacement of formation stick 10 about the yaw axis. Yaw rate gyroscope 42 continuously generates an electrical signal which is proportional to the instantaneous actual yaw rate, $\dot{\psi}_g$, of the interceptor. For the same formation or command signals and actual yaw rates, $\dot{\psi}_f$ and $\dot{\psi}_g$, respectively, the signals from amplifier 40 and yaw rate gyroscope 42 are designed to be equal and opposite. As long as the two input signals to summing network 41 are equal and opposite, output signal $\dot{\psi}_e$ is zero. A change in one of the input signals, such as results from a change of position of stick 10 about its yaw axis, unbalances network 41, causing a signal $\dot{\psi}_e$ to be coupled to control surface servo 43. The polarity and magnitude of this signal are determined by the direction and magnitude of the unbalancing of network 41. In response to the yaw rate error signal, $\dot{\psi}_e$, control surface servo 43 adjusts the position of the rudder (not shown) of the interceptor. As soon as the interceptor responds to this rudder change, the output of yaw rate gyro 42 also is changed, thereby re-establishing the balance between the inputs to summing network 41. The rudder is then maintained in its new position until network 41 is again unbalanced.

The signal from formation stick 10 resulting from displacement of the stick about its yaw axis is also coupled to the roll channel of autopilot 8 through lagged differentiator 44 and amplifier 45. Lagged differentiator 44 produces a signal approximately proportional to the rate of change of the formation stick position. The purpose of the actuation of the ailerons (not shown) by the roll channel of the autopilot is to produce a momentary roll rate in the proper direction to establish a coordinated turn. In addition to this initial signal, a sideslip angle signal is coupled into the roll channel through amplifier 46 and summing network 47. This signal is designed to actuate the ailerons in a manner to produce a roll rate in such a direction as to reduce the sideslip angle to zero. The output of summing network 47 is therefore a signal, $\dot{\phi}_f$, proportional to a desired roll rate of the interceptor. This signal is compared to the actual roll rate, $\dot{\phi}_g$, as indicated by roll rate gyro 48 in summing network 49. The difference between the two input signals to network 49 is coupled into control surface servo 50, which actuates the ailerons in a direction to reduce the difference signal. As soon as the output of roll rate gyro 48 is again equal to the formation roll rate signal $\dot{\phi}_f$, signal $\dot{\phi}_e$ reduces to zero and the ailerons are maintained in their new position until network 49 is again unbalanced The signals proportional to the displacement of formation stick 10 about the pitch and yaw axes are also coupled through amplifiers 51 and 52 to the vertical and horizontal deflection plates, respectively, of a second gun of oscilloscope 21. A visual indication of the magnitude of movement of formation stick 10 about these axes is thereby presented on the plate of oscilloscope 21. In order to readily differentiate between the indications on the plate of oscilloscope 21 resulting from the aiming error angle signals from fire control computer 1 and the signals resulting from the movement of formation stick 10, a variation in the pattern indicated on the plate is incorporated into the oscilloscope circuitry. Thus, sine and cosine generator 53 is utilized to generate small sinusoidal signals which are coupled to the vertical and horizontal deflection plates of the second gun of oscilloscope 21. As a result of these signals, instead of a dot appearing on the plate of oscilloscope 21, the second gun generates small circle 54. The displacement of the center of this circle from the reference axes 25 and 26 is made proportional to the pitch and yaw rates generated by moving formation stick 10.

The desired pitch and yaw rate signals from movement of the formation stick are limited by the maximum stick displacement. The roll rate obtainable is dependent on the rate with which the formation stick is moved about its yaw axis. Optimum operation of the system in the manual mode depends upon a proper selection of the gains in the various circuits. As an example, using an error dot gain of two degrees per inch on the face of the oscilloscope 21, a skilled pilot can readily maintain circle 54 about dot 24 when full stick displacement causes circle 24 to move one inch in both directions and the corresponding pitch and yaw rates called for by such full stick displacement are ten degrees per second. A variation in the sensitivity of the system can readily be obtained by varying the gain of amplifiers 51 and 52, thereby reducing or increasing the response of circle 54 in pitch and yaw, respectively, for a given displacement of formation stick 10.

It is the purpose of the above-described display system to enable the pilot to immediately see the result of his displacement of formation stick 10. All the pilot need do in order to reduce the aiming error signal to zero is to maintain circle 54 about dot 24. If this is done, dot 24 normally progressively moves toward the center of the oscilloscope. The speed at which dot 24 moves toward the center of the scope is determined by the gain of amplifiers 51 and 52. If amplifiers 51 and 52 have a low gain, dot 24 moves rapidly toward the center of the oscilloscope for a given stick displacement. If amplifiers 51 and 52 have a high gain, the same displacement of stick 10 results in a large displacement of circle 54 and dot 24 moves more slowly toward the center of the oscilloscope. This is due to the lower rates being generated by autopilot 8 for a given position of circle 54. The setting of amplifiers 51 and 52 is adjusted to correspond to the skill and speed of response of the pilot in his actuation of formation stick 10. It is to be noted that as dot 24 moves toward the center of the scope, and as the pilot maintains circle 54 superimposed about dot 24, the correction signals conveyed to the autopilot 8 are progressively decreased, thereby greatly reducing the chances of overshooting the computed heading.

The improved display device is described above in connection with tracking aircraft. This invention is not limited to such use. The display device can be used in any condition indicating system to immediately indicate to the operator the magnitude of the rate of correction he is applying to compensate for deviation of the condition from a desired state.

Although this invention has been described and illustrated in detail, it is to be clearly understood that the same is by way of illustration and example only and is not to be taken by way of limitation, the spirit and scope of this invention being limited only by the terms of the appended claims.

I claim:

1. In a device for guiding an airplane, the combination, with an autopilot arranged to guide said airplane in accordance with received command signals and a fire control computer arranged to furnish computed command signals to said autopilot to direct said plane along a computed course, of manual means effective selectively to supply said manual command signals to said autopilot, and means for displaying said manually supplied command signals simultaneously with computed command signals from said fire control computer, whereby a visual comparison of said manually commanded and said computed signals may be made.

2. A correction display device as recited in claim 1 in which said signal comparing means comprises an oscilloscope having separate visual outputs for said command signals and for said computed signals, and means for individually subjecting said oscilloscope to the outputs of means for generating said computed signals and to the output of means for computing said command signals.

3. An improved tracking display for aircraft useful for accurately maneuvering an aircraft in relation to a target comprising computer means having a signal output proportional to the aiming error angle of said aircraft; a formation stick in said aircraft; aircraft maneuvering means responsive to the displacement of said formation stick and connected to change at an adjustable rate the heading of said aircraft, said rate being determined by the magnitude of displacement of said formation stick; signal generating means connected to produce an output proportional to the displacement of said formation stick and means for comparing the outputs of said computer means and said signal generating means.

4. A tracking display for aircraft as recited in claim 3 in which said comparing means comprises an oscilloscope having separate visual outputs for each input signal and means for individually subjecting said oscilloscope to the output signals of said computer means and said signal generating means.

5. An improved tracking display for aircraft for accurately maneuvering an aircraft relative to a target comprising computer means having signal outputs proportional to the aiming error angles about two perpendicular axes; an oscilloscope having separate visual output indications for input signal groups representing said aiming error angle signals and representing command signals; means subjecting said oscilloscope to the signal outputs of said computer means in a manner to produce a visual indication displaced from preselected reference axes on the plate of said oscilloscope by amounts respectively proportional to said signal outputs of said computer means; a formation stick having degrees of freedom about each of two perpendicular axes; command signal generating means having output signals respectively proportional to the magnitude of displacement of said formation stick about each of said formation stick axes; means subjecting said oscilloscope to the signal outputs of said command signal generating means in a manner to produce a visual indication displaced from preselected axes on the face of said oscilloscope by an amount respectively proportional to said signal outputs of said command signal generating means; and aircraft maneuvering means responsive to the displacement of said formation stick and connected to change, at preselected rates proportional to the displacement of said formation stick about said two formation stick axes, the heading of said aircraft about said two aiming error axes.

6. An improved tracking display for aircraft useful for accurately maneuvering an aircraft in relation to a target comprising means for producing error signals which are predetermined functions of the errors in aircraft pitch direction and aircraft yaw direction consistent with successful interception of said target, an oscilloscope responsive to said error signals for displaying the magnitudes and directions of said pitch and yaw errors, aircraft maneuvering means connected to change at adjustable rates the aircraft pitch direction and aircraft yaw direction, signal generating means having outputs which are predetermined functions of the rates of change of said pitch and yaw directions in response to said aircraft maneuvering means, and means responsive to said rate signal generating means for displaying on said oscilloscope an indication of said rates of change of pitch and yaw directions.

7. An improved tracking display for aircraft useful for accurately maneuvering an aircraft relative to a target comprising computer means for generating error signals which are predetermined functions of the aiming errors of said aircraft in pitch and yaw, respectively, relative to a successful interception heading; an oscilloscope having separate visual output indications for input signal groups representing said aiming error signals and representing command signals; means subjecting said oscilloscope to the signal outputs of said computer means in a manner to produce a visual indication displaced from two preselected perpendicular reference axes on the plate of said oscilloscope by amounts respectively proportional to the pitch and yaw aiming error signal outputs of said computer means; a formation stick having degrees of freedom about two perpendicular axes; aircraft maneuvering means responsive to the movement of said formation stick from a preselected null position in a manner to vary at preselected rates proportional to the magnitude of the displacement of said formation stick, the attitude of said aircraft about pitch, yaw and roll axes, said aircraft maneuvering means being responsive to displacement of said formation stick about one of said axes in a manner to produce a pitch rate of said aircraft and said aircraft maneuvering means being responsive to the displacement of said formation stick about the second of said axes in a manner to produce a yaw rate of said aircraft and a roll rate sufficient to produce a coordinated turn of said aircraft; command signal generating means having individual pitch and yaw rate output signals proportional to the displacements of said formation stick about each of said axes of freedom; and means subjecting said oscilloscope to said output signals from said command signal generating means in a manner to provide a visual indication on the plate of said oscilloscope which is displaced from said two perpendicular reference axes with said yaw rate output signal resulting in displacement of said visual indication from the same axis and in the same direction as the visual indication of the yaw aiming error signal and the pitch rate output signal resulting in displacement of said visual indication from the same axis and in the same direction as the visual indication of the pitch aiming error signal.

8. In a tracking display system for aircraft, means for generating an error signal indicative of the deviation of said aircraft from a predetermined heading, automatic aircraft maneuvering means for changing the heading of said aircraft at an adjustable rate, means responsive to manual control for producing a command signal which is a predetermined function of a desired rate of change of the heading of said aircraft, means for alternatively subjecting said aircraft maneuvering means to said manual control command signal and said error signal, and means for continuously comparing said error signal with said command signal to provide a guide for the operator of said manual control means.

9. In a tracking display system for aircraft, means for generating an error signal indicative of the deviation of said aircraft from a predetermined heading, automatic aircraft maneuvering means for effecting a rate of change of heading of said aircraft in response to an input signal supplied to said maneuvering means, means responsive to manual control for producing a command signal which is a predetermined function of a desired rate of change of the heading of said aircraft, and means for alternatively supplying said command signal and said error signal to said maneuvering means as the input signal thereto.

10. In combination with a fire control computer, an aircraft, and an automatic pilot adapted to operate in conjunction with said computer, means for presenting pitch and yaw aiming error signals derived from said fire control computer, a manually operable formation stick adapted to supply command signals to said autopilot, and means for simultaneously presenting manually commanded signals from said formation stick for comparison with said pitch and yaw aiming error signals, whereby the pilot may compare said manually inserted command signals with said pitch and yaw aiming error signals.

References Cited in the file of this patent
UNITED STATES PATENTS

| | | |
|---|---|---|
| 2,463,529 | Ferrill | Mar. 8, 1949 |
| 2,613,352 | Kellogg 2nd | Oct. 7, 1952 |
| 2,644,941 | Kellogg 2nd | July 7, 1953 |
| 2,698,723 | Kutzler | Jan. 4, 1955 |